(12) United States Patent
Kristensson

(10) Patent No.: US 7,895,518 B2
(45) Date of Patent: Feb. 22, 2011

(54) SYSTEM AND METHOD FOR PREVIEW AND SELECTION OF WORDS

(75) Inventor: Per Ola Kristensson, Vellinge (SE)

(73) Assignee: Shapewriter Inc., Dover, DE (US)

( * ) Notice: Subject to any disclaimer, the term of this patent is extended or adjusted under 35 U.S.C. 154(b) by 930 days.

(21) Appl. No.: 11/796,654

(22) Filed: Apr. 27, 2007

(65) Prior Publication Data

US 2008/0270896 A1 Oct. 30, 2008

(51) Int. Cl.
*G06F 17/00* (2006.01)
(52) U.S. Cl. .................. 715/263; 715/268; 715/816
(58) Field of Classification Search ............... None
See application file for complete search history.

(56) References Cited

U.S. PATENT DOCUMENTS

| | | | |
|---|---|---|---|
| 5,677,710 A * | 10/1997 | Thompson-Rohrlich | .... 345/173 |
| 5,832,474 A | 11/1998 | Lopresti et al. | |
| 5,926,566 A * | 7/1999 | Wang et al. | .................. 382/185 |
| 6,614,422 B1 * | 9/2003 | Rafii et al. | .................. 345/168 |
| 6,718,060 B1 * | 4/2004 | Yokota et al. | ............... 382/187 |
| 7,098,896 B2 | 8/2006 | Kushler et al. | |
| 7,382,358 B2 * | 6/2008 | Kushler et al. | .............. 345/168 |
| 2004/0120583 A1 | 6/2004 | Zhai | |
| 2005/0100217 A1 | 5/2005 | Abdulkader et al. | |
| 2005/0114115 A1 | 5/2005 | Karidis et al. | |
| 2005/0190973 A1 | 9/2005 | Kristensson et al. | |
| 2006/0126946 A1 | 6/2006 | Denoue et al. | |
| 2006/0210163 A1 | 9/2006 | Garside et al. | |
| 2006/0210173 A1 | 9/2006 | Jurion et al. | |
| 2006/0253793 A1 | 11/2006 | Zhai et al. | |
| 2007/0038538 A1 | 2/2007 | Silverbrook et al. | |
| 2007/0040813 A1 | 2/2007 | Kushler et al. | |
| 2008/0260252 A1 * | 10/2008 | Borgaonkar et al. | ........ 382/189 |

OTHER PUBLICATIONS

Leotti, George,"SofType Version 3.1," © 1997, ONN Inc., series of 21 Figures generated from screen dumps of the SoftType software in execution, downloaded from <"http://orin.com/binaries/st31dmz.exe">, 21 pages total.*

Leotti, George, "SoftType Version 3.1 Help File," © circa 1997, downloaded from <"http://orin.com/binaries/st31dmz.exe">, extracted from executable program, 38 pagse, labeled 1-38 of 38.*

(Continued)

*Primary Examiner*—Doug Hutton
*Assistant Examiner*—James H Blackwell
(74) *Attorney, Agent, or Firm*—Perkins Coie LLP

(57) ABSTRACT

A system, method and computer-readable medium that previews words and commands recognized by a continuous stroke recognizer based on input into a virtual keyboard layout is presented. The system and method allows a user to see the word that will be recognized or output before the user commits the continuous stroke input to the system. Further, after recognition and output, the system presents the recognized output word and the closest word candidates in a correction display integrated with the virtual keyboard layout. Among other things, the user is provided with options to change the current output word by selecting another word candidate on the correction display, and to delete the current output word by selecting the representation of the current output word on the correction display.

51 Claims, 9 Drawing Sheets

OTHER PUBLICATIONS

Kristensson, P.O. and Zhai, S., SHARK2: A Large Vocabulary Shorthand Writing System for Pen-based Computers, Proceedings of the 17th Annual ACM Symposium on User Interface Software and Technology 2004, pp. 43-52 (Oct. 24, 2004), USA.

Arvo, J. and Novins, K., Fluid Sketches: Continuous Recognition and Morphing of Simple Hand-Drawn Shapes, Proceedings of the 13th Annual ACM Symposium on User Interface Software and Technology 2000, pp. 73-80 (Nov. 6, 2000), USA.

Zhai, S. and Kristensson, P.O., Shorthand writing on Stylus Keyboard, Proceedings of the ACM Conference on Human Factors in Computing Systems 2003, pp. 17-24 (Apr. 5, 2003), USA.

Arvo, J. and Novins, K., Smart Text—A Synthesis of Recognition and Morphing, AAAI Spring Symposium on Smart Graphics, pp. 140-147 (Mar. 2003), USA.

ISA/US, International Search Report for PCT/US07/10280, Jul. 15, 2008.

ISA/US, Written Opinion of the International Searching Authority for PCT/US07/10280, Jul. 15, 2008.

ISA/US, Notification of Transmittal of the International Search Report and the Written Opinion of the International Searching Authority, or Declaration for PCT/US07/10280, Jul. 15, 2008.

Kristensson, P. O., "Design and Evaluation of a Shorthand Aided Soft Keyboard," Master's Thesis, Linkoping University, Sweden (Aug. 28, 2002), Sweden, 107 pages.

Darragh, J., Witten, I., and James, M., "The Reactive Keyboard: A Predictive Typing Aid," IEEE Computer (IEEE Press: Nov. 1990), USA, pp. 41-49.

* cited by examiner

SYSTEM AND METHOD FOR PREVIEW AND SELECTION OF WORDS

FIELD OF THE INVENTION

The present invention relates generally to the preview of text entry for computers, PDA's, cellular phones, smartphones, tablet PC's and other devices, particularly text entry via a continuous stroke recognizer based on a virtual keyboard layout.

BACKGROUND OF THE INVENTION

The increasingly limiting bottleneck to information flow in ultra-mobile computing results from, among other things, the lack of efficient user interfaces on these devices. In comparison to desktop or laptop computers, today's handsets and tablet PCs are far more cumbersome to use. One solution is "shape writing" where a user inputs shorthand gestures that are defined by a virtual keyboard layout. Such shorthand gestures are continuous strokes that are recognized by a continuous stroke recognizer based on a virtual keyboard. Examples of such systems are described in Kristensson, P.O., Design and Evaluation of a Shorthand-Aided Soft Keyboard, Master's thesis, Linköping University (2002); U.S. Pat. No. 7,251,367, System and method for recognizing word patterns based on a virtual keyboard layout (Zhai); U.S. Pat. No. 7,098,896, System and method for continuous stroke word-based text input (Kushler et al.); and Kristensson, P. O. and Zhai, S., SHARK$^2$: A Large Vocabulary Shorthand Writing System for Pen-based Computers, Proc. 17$^{th}$ Annual ACM Symposium on User Interface Software and Technology 2004, 43-52 (2004). Such systems and methods do not provide previews based upon uncompleted strokes; do not provide preview or correction displays integrated in a virtual keyboard (for example, in Kushler et al., a display is incorporated in a word processing application, and in Kristensson, P. O. and Zhai, S., a user must utilize a pull-down menu); and do not provide for deletion of words in such a preview or correction display.

Similarly, U.S. Pat. No. 7,706,616, System and method for recognizing word patterns in a very large vocabulary based on a virtual keyboard layout (Kristensson et al.) and U.S. Pat. No. 7,382,358, System and Method for Continuous Stroke Word-Based Text Input (Kushler et al.), present systems or methods for recognizing continuous strokes based on a virtual keyboard layout, but do not provide a preview of the recognized command for an uncompleted stroke; an integrated correction display; or an option to delete or cancel an output word by selecting a representation of the current word in a selection display. United States Patent Application 20050114115, Typing accuracy relaxation system and method in stylus and other keyboards (Karadis et al.), discloses a system and method to analyze tapping patterns and automatically correct mis-tapped words, but does not use a continuous stroke recognizer. Arvo, J. and Novins, K., Fluid sketches: continuous recognition and morphing of simple hand-drawn shapes. Proceedings of the 17$^{th}$ Annul. ACM Symposium on User Interface Software and Technology 2000: 73-80 (2000), presents a software system to recognize pen-gestures while a user is articulating the pen-gesture, but works with a limited set of pen-gestures. See, also, Zhai, S. and Kristensson, P. O., Shorthand Writing on Stylus Keyboard. Proceedings of the ACM Conference on Human Factors in Computing Systems 2003, 17-24 (2003).

Briefly, shorthand gesturing on a virtual keyboard works by having a user gesturing a pen or finger trace on a virtual keyboard layout (such as the virtual keyboard layout illustrated in FIG. 3 of U.S. Pat. No. 7,251,367 (Zhai), which patent is incorporated herein by reference). When the user lifts up the pen or finger, the system recognizes the pen or finger trace. The pen or finger trace is then compared with the geometric trace or pattern connecting the letter keys of a template word in a lexicon. This comparison is repeated for all words in a lexicon. The word that most closely matches the user's pen or finger trace is returned as the recognized word.

Some users may not feel confident when shorthand gesturing because the input interface is new to them. Such users, including novice users, simultaneously need to learn a new shorthand gesture text input interface and verify that they are on the right track.

Another problem with existing shorthand gesturing is that no recognition or feedback from the system is communicated to the user while the user is producing a shorthand gesture to indicate the user is or is not on the right track.

Existing shorthand gesturing does not provide for repeated and/or contemporaneous recognition of a user's pen or finger trace. In addition, there is a need to avoid situations in which a recognized word is sent to the associated application (such as a word processing application or e-mail client) without confirmation that it is the word intended by the user, and a need to provide a user with the opportunity to cancel the process if the user has made a mistake.

Users may also want to send computer system commands such as "Copy," "Print" and "Track Changes" with a shorthand gesture. In this regard, reference is made to U.S. Pat. No. 7,487,461, System and method for issuing commands based on pen motions on a graphical keyboard (Zhai et al.), which does not provide a preview of an uncompleted stroke, or a display integrated with a virtual keyboard, or an option to delete an unintended word.

When a user is gesturing a shorthand gesture, the need for a preview is also desired. In addition, computer system commands perform operations that affect the user's application and can be destructive to the user's work. For example, the computer system command "Close" may close the user's application and result in data loss for the user.

Clearly there is a need for both novice and expert users of shorthand gesturing for a preview of the word or system command input by a user as a pen or finger trace, and for other solutions as set forth herein.

SUMMARY OF THE INVENTION

The present invention satisfies such needs, and presents a system, a computer program product comprising a computer-readable medium having computer-executable instructions, and an associated method for indicating to users the currently recognized word and what word will be output to the computer application. Prior continuous stroke recognizers recognize and output a recognized word after a user has completed a stroke. In one aspect of the present invention, a user's continuous stroke is constantly recognized while a user is inputting a continuous stroke, and a preview (e.g. a continuously updated preview) of the current matching words of users' continuous strokes is displayed on a display integrated in a virtual keyboard, in one aspect through a software program or device. In another aspect, after the user has completed a stroke, the system and method outputs the recognized output word, and presents the recognized output word and the closest word candidates in a correction display integrated with the virtual keyboard layout. In yet another aspect, the user may change the current output word by selecting another word candidate on the correction display. The user may then delete the current output word by selecting the representation of the current output word on the correction display.

A user can input a stroke by for example pushing and sliding a pen or finger on a touch-screen or electronic tablet surface, and a user can complete an input stroke by, for example, lifting a pen (or stylus) or finger from a touch-screen or electronic tablet surface.

The present system repeatedly recognizes the user's continuous stroke input before the stylus or finger is lifted. If a set of matching words is found, the best matching words are displayed to the user in a correction display. In one aspect of the invention, the currently recognized preview word has a distinct background color.

In another aspect of the invention, once a user completes a stroke, for example by lifting up the pen or finger from a touch-screen or electronic tablet surface, the best matching word is recognized by the continuous stroke recognizer and shown in a correction display with or without the next-best matching words. In another aspect, the user may then delete the current output word by selecting the representation of the output word in the correction display. The user may change the current output word by selecting a representation of one of the other next-best matching words in the correction display.

In one aspect of the invention, the correction display is always present and is or can be integrated with a virtual keyboard. Integrating the correction display with a virtual keyboard has the advantage that the preview word is in close vicinity to the virtual keyboard which is in the user's focus of attention.

The correction display, in one aspect, can show more than just one preview word. Since many words may be likely to match a user's input (completed or uncompleted input), it is beneficial to show some additional closely matched word candidates and not only the closest word. In one aspect of the invention, after the user has lifted up the pen or finger from the virtual keyboard, the preview word is sent to the user's operating system or application. The latest word that was sent to the application is the current output word. If the user later realizes that the wrong word was recognized, the user is provided with an opportunity to change the current output word into another similar or close word candidate shown on the correction display by selecting it.

In one aspect of the invention, if the correction display does not show the word that the user intended to write after lifting the stylus of finger, the user may decide to start over. It is cumbersome to delete a word that is already sent to the application. To make this easier, one aspect of the invention provides that the user can click on the representation of the current output word in the correction display to delete the current output word.

In another aspect of the invention, when a user is producing a shorthand gesture and notices the intended word shown as a preview in the correction display, the user can release the pen or finger even if the shorthand gesture is not completed. The lexicon of recognizable words may contain substrings of words in the language. For instance, the lexicon can contain the substring "th" which is a prefix for the word "the". If the user is producing a shorthand gesture for "the," the system in one aspect will notice when the user's pen or finger trace is recognized as the word pattern for the prefix "th" that the user is likely to intend to write the word "the," since the prefix "th" is mapped to the word "the" in the system's lexicon. If the user notices the preview, the user can release the pen or finger for some shorthand gestures of the intended word. This is also an advantage to expert and repeat users who can learn the minimal shorthand gesture necessary for the system to recognize the intended word.

When a user is producing a shorthand gesture, the user may notice that an alternative word other than the most likely preview word is shown in the correction display. For example, if the user is intending to write the word "the," the word "three" may show up as the primary preview word and the intended word "the" as the secondary preview word. The user cannot release the pen or finger at that point since that means that the unintended word "three" would be output. Instead, in one aspect of the invention, the user can quickly move the pen or finger towards a representation of the intended word shown as a preview in the correction display. This is possible because the method and system in one aspect will recognize or notice that the user moved outside the virtual keyboard at or above a predetermined threshold speed such that the user most likely intended to directly select a preview word in the correction display.

When a user is producing a shorthand gesture, the user may accidentally produce a wrong trace. In such a case, the user will not see a word in the preview display that matches the intended word. The user may at this time want to cancel the shorthand gesture before it is recognized as a word and sent to an application. In such a case, one aspect of the invention provides that the user may move the pen or finger to left, right or bottom outer edges of the virtual keyboard. Another alternative is a special cancel icon or cancel area where the user can drag to signal cancel.

In one aspect, the user can also delete the current output word by selecting a representation of it in the correction display.

A constantly updated display may take visual attention away from the user. To prevent this adverse effect, in one aspect the preview is only displayed if the user inputs the continuous stroke slowly. In another aspect, any movement slower than certain letter keys per second triggers pattern recognition and visual preview. In one example embodiment, this check is performed by the system every 20 ms (50 Hz).

In one embodiment, an uncompleted stroke can be cancelled by selecting a representation of cancel input. For example, a user can slide a pen outside the left, right or bottom virtual keyboard edges to signal cancellation.

It is possible to enter both words and commands in one shape writing system. For example, see, U.S. Pat. No. 7,487,461, System and method for issuing commands based on pen motions on a graphical keyboard (Zhai et al.).

In one exemplary embodiment, suppose a user wants to issue the command "Copy". The user may start by landing the pen or stylus on the "Command" key or any other trigger key, and then drag it to the first letter key in the command, in this case the "C" key. Since Command-C matches another command ("Cut") that is shorter and/or more frequently used, the invention then previews "Cut" (FIG. 12A). Other commands that also match the sequence "Command-C", in this case "Copy", "Close" and "Comment", are shown in a list of alternatives to the left in the correction display. To enter "Copy" the user may either quickly slide the pen towards "Copy" in the leftmost, or continue to gesture towards the second letter key "O". Since Command-C-O matches "Copy" the command "Copy" is now previewed (FIG. 12B). Then, when the user lifts up the pen, the "Copy" command is issued.

Any commands shown in the alternative list to the left of the center panel can be directly selected by quickly dragging the pen towards the command name. The method and system of the present invention in one embodiment can unambiguously separate gestures from alternative list selections since once the pen tip leaves the keyboard area it does not constitute a valid gesture. Since movement dynamics are taken into account when deciding if pattern recognition and update of the preview should be performed, the alternative list will not suddenly change despite the user gesturing over the keyboard while heading towards the desired command.

In one aspect, the present invention comprises software which may be loaded and run on a computer, PDA, cellular phone, smartphone, tablet PC and other electronic devices. In another aspect, the invention comprises a computer, PDA, cellular phone, smartphone, tablet PC and other electronic or mobile device which provides some or all of the functionality disclosed herein.

The invention in one aspect provides a method of displaying a word preview in a continuous stroke system, comprising: receiving a first part or portion of a continuous stroke which has been input into a virtual keyboard; comparing the first part of the continuous stroke with a plurality of known word patterns which correspond to a plurality of known words; generating a preview of known words which correspond to that first part of said continuous stroke; and displaying the preview on a display before the user has completed entry of the continuous stroke (e.g. before the user has lifted up his or her pen or stylus). In another aspect, the method comprises: receiving a second part or portion of said continuous stroke; comparing the first and second parts of the continuous stroke with such known word patterns corresponding to known words; displaying a preview of known words corresponding to the first and said second parts; and displaying a preview on the display prior to completion of said continuous stroke. The method in one aspect provides for an ongoing, continuously updated preview which is updated as a user moves a pen, stylus or finger from location to location on a virtual keyboard.

In various aspects of the invention, the preview may be displayed on a display integrated with the virtual keyboard (e.g. inside a software component keyboard, adjacent or in close proximity to it, such as directly above), or positioned outside the virtual keyboard.

Another aspect of the invention provides a method comprising: receiving a completed continuous stroke; comparing the completed continuous stroke with a plurality of known word patterns which correspond to a plurality of known words; displaying a plurality of known words which correspond to said completed continuous stroke; and displaying the known words on the display.

In another aspect, the known words in the preview are alternatively selectable by a user, and the method accepts a selection of a desired known word in the preview when a part of a continuous stroke intersects the desired known word in the preview (e.g. a pen, stylus or finger touches the desired known word).

In yet another aspect, the continuous stroke system is associated with a computer operating system (on a stationary computer, embedded device or server, for example), and the desired known word is output to the associated operating system. This may occur when a user sees a preview of a word and lifts up his or her pen, or when a user quickly (e.g. more quickly than expected) moves his or her stylus to a representation of a preview word (most likely an alternate next best matching word). If the rate of movement is as expected, the method in one aspect will treat such movement as a continuation of the continuous stroke of the user.

In other aspects of the invention, a continuous stroke system is associated with an active application (for example, a word processor, an e-mail client, instant messaging client, forms application or other application running or capable of running on a computer, PDA, cellular phone, smartphone, tablet PC or other device), and the desired known word is output to the associated active application.

Another aspect of the invention provides a method comprising: receiving information about movement dynamics (i.e. spatiotemporal information) concerning the continuous stroke; comparing this spatiotemporal information to expected values; and displaying a preview on the display if this spatiotemporal information differs from expected values. Alternatively, the invention may accept the selection of a desired known word in the preview if such spatiotemporal information differs from expected values.

In another aspect of the invention, the method comprises: receiving speed information concerning the rate of movement of the continuous stroke; comparing the speed information to a predetermined value; outputting to an associated active application a known word in the preview if the speed information is greater than the predetermined value; whereby a known word in the preview may be selected by a user.

For example, in one embodiment, a correction display will update only when a user moves a pen or finger slowly; if the pen or finger moves quickly (i.e. greater than a predetermined speed), the display remains static. In this way, a user can select a preview word in the correction display by moving his stylus or finger quickly, for example. This avoids a situation where a preview word is selected due to the fact that a user moves at a normal rate toward a preview word in the current correction display without an intent to select such word, but instead with the intent to continue toward completion of the continuous stroke.

In other aspects of the invention, the method comprises terminating the receiving of a continuous stroke if part of the continuous stroke intersects with an edge of the virtual keyboard; or terminating the receiving of the continuous stroke if part of the continuous stroke intersects with an icon in or near the virtual keyboard (e.g. an icon designated "cancel").

Another aspect of the invention provides a method of defining word patterns of a plurality of known words by a plurality of input paths, wherein each path is associated with a word input into a virtual keyboard; and matching the path of one or more parts of the continuous stroke with a corresponding word pattern.

In other aspects of the invention, the "words" described herein comprise commands to an electronic device associated with the continuous stroke system (e.g. "Cut", "Copy", "Close"). In one such aspect, the method comprises: comparing one or more parts of the continuous stroke with a plurality of known command patterns which correspond to a plurality of known commands; matching these part(s) of the continuous stroke to a corresponding command pattern; and executing an instruction corresponding to said corresponding command pattern.

In various aspects of the present invention, the method, system and computer-readable medium comprises a computer, PDA, cellular phone, smartphone, tablet PC or mobile communications device having a virtual keyboard; or in another aspect, a projection device for projecting the virtual keyboard on a wall, screen or display; whereby a user may input a continuous stroke through the projected representation of the virtual keyboard.

The invention in one aspect provides a method of displaying a list of candidate words in a continuous stroke system having a virtual keyboard with an integrated correction display, comprising: receiving a continuous stroke which has been input into a virtual keyboard; comparing the continuous stroke with a plurality of known word patterns which correspond to a plurality of known words; generating a plurality of known words which correspond to the continuous stroke; and displaying a plurality of known words on a correction display integrated with the virtual keyboard. In one aspect, a best matching word may be output to an associated active application. In another, the best matching word may be deleted from (a) the associated active application or (b) the correction display if the best matching known word is selected by a user on the correction display.

The correction display may be adjacent to the keys of the virtual keyboard. Words may be deleted from wherever they are output; for example, if the word "the" is output to a word processor, Microsoft Word, for example, and a user clicks on "the" on the correction display, the word "the" is deleted from the Word application.

In other aspects, a best matching word is displayed with a distinct graphical attribute, such as an alternate color (i.e. different from the other preview words), or displayed with an associated icon. These aspects, as with all others, may include an associated computer, PDA, cellular phone, smartphone, tablet PC or mobile communications device having a virtual keyboard; or a projection device for projecting the virtual keyboard on a wall, screen or display.

Any of the foregoing aspects of the invention may be implemented through a computer-readable medium having computer-executable instructions for performing one or more aspects of the invention. In addition, the invention includes a system for performing one or more, or all, of the foregoing methods.

The general object of the invention is to provide a preview of words, phrases and/or commands based upon text entry at any given point in time. One advantage and improvement over current systems and interfaces which is provided by the present invention is repeated and/or contemporaneous recognition of a user's pen or finger trace. If the pen or finger trace resembles a shorthand gesture for a word, the improved system and method shows the word as a preview on a correction display integrated with the keyboard.

By using this improved system and method, users gain an advantage by having knowledge that when they lift up their finger or pen, the word that is shown in the preview on the correction display is the word that is recognized and will be sent to the user's application, for example, an email client.

The preview provides the further advantage of increasing a users' confidence and making the user more certain that the application is working as intended. Further, support costs may be reduced since it is easier for the user to guess what they should or may do.

For novice users, previews of computer system commands provide the user with security and a sense of trust in the system.

For expert users such previews provide the user with confidence that the intended command will be sent to the application, even if the expert user knows they did not produce the shorthand gesture accurately and there is a high risk the intended shorthand gesture would normally not be recognized by the continuous stroke recognizer.

These and other objects and advantages will become apparent from the foregoing and ongoing written specification, the accompanying drawings and the appended claims.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

In FIG. 10, the shorthand gesture for "th" has been input, and the preview of the most likely word "the" is illustrated in a correction display integrated with the keyboard.

DETAILED DESCRIPTION OF PREFERRED EMBODIMENTS

The following definitions and explanations provide background information pertaining to the technical field of the present invention, and are intended to facilitate the understanding of the present invention without limiting its scope:

"ATOMIK": Alphabetically Tuned and Optimized Mobile Interface Keyboard. A keyboard layout that is optimized by an algorithm in which the keyboard was treated as a "molecule" and each key as an "atom". The atomic interactions among the keys drive the movement efficiency toward the maximum. Movement efficiency is defined by the summation of all movement times between every pair of keys weighted by the statistical frequency of the corresponding pair of letters. ATOMIK is also alphabetically tuned, causing a general tendency that letters from A to Z run from the upper left corner to the lower right corner of the keyboard, helping users find keys that are not yet memorized. ATOMIK is one exemplary virtual keyboard that can be used in association with the present invention.

"PDA": Personal Digital Assistant. A pocket-sized personal computer. PDAs typically store phone numbers, appointments, and to-do lists. Some PDAs have a small keyboard, others have only a special pen that is used for input and output on a virtual keyboard.

"Virtual Keyboard": A computer simulated keyboard with touch-screen interactive capability that can be used to replace or supplement a keyboard using keyed entry. In a typical virtual keyboard keys may be tapped serially with a stylus. It is also referred to as graphical keyboard, on-screen keyboard, or stylus keyboard.

Figure 1:
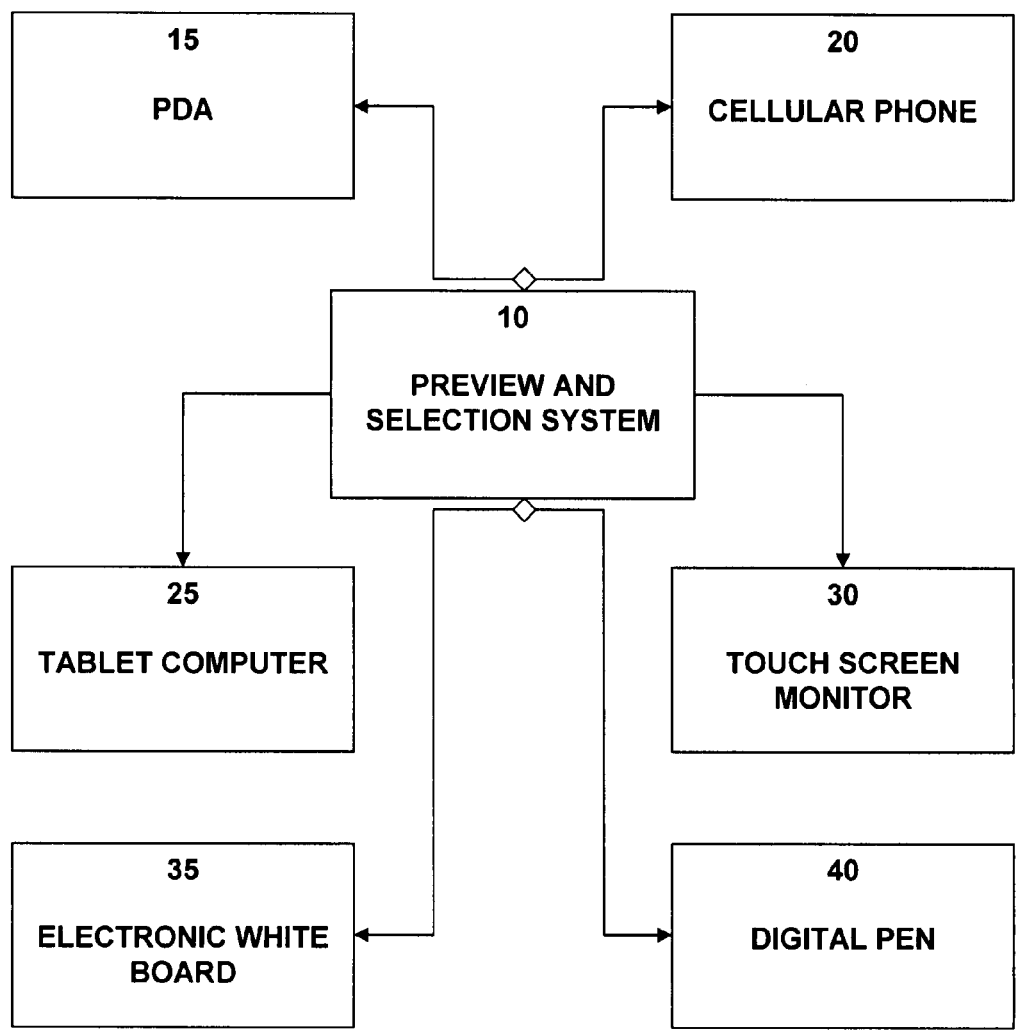
FIG. 1 is a schematic illustration of an exemplary operating environment in which the preview and selection system of the present invention can be used.

Now turning to the drawings, FIG. 1 portrays exemplary environments in which the preview and selection system 10 can be installed. The computer or device in which the preview and selection system 10 is installed can be a mobile device such as a PDA 15, cellular phone 20 or smartphone. In addition, the system and method 10 may be utilized with devices such as a tablet computer 25, touch screen monitor 30, electronic white board 35, and digital pen 40.

The system and method may be utilized with device(s) using a continuous stroke recognizer based on a virtual keyboard layout or similar interface for entry, represented by auxiliary device. Alternatively, in another embodiment, the preview and selection system 10 can be saved on a suitable storage medium such as a diskette, a CD, a hard drive, or like devices.

Figure 2:
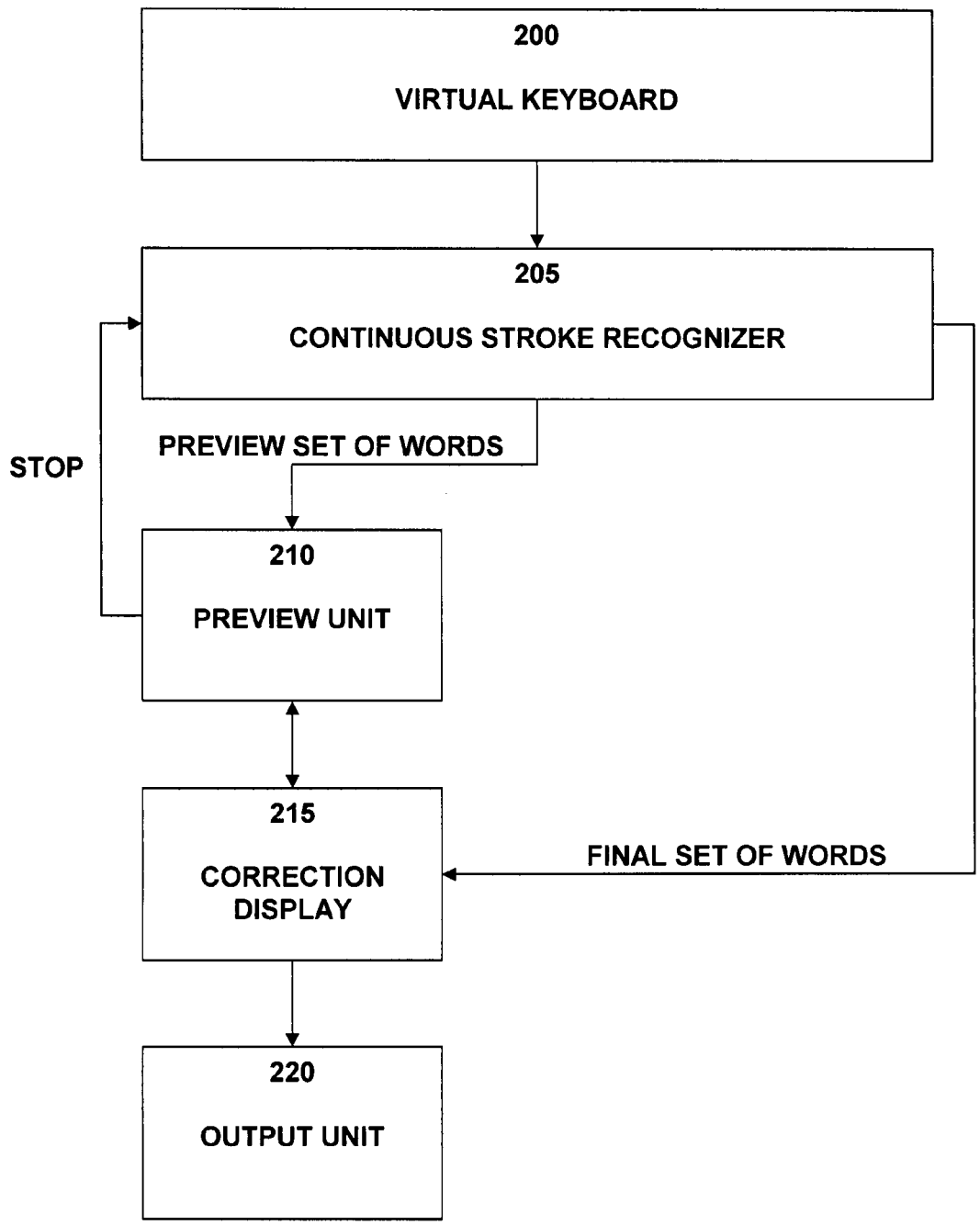
FIG. 2 is a block diagram of a high-level hierarchy of the preview and selection system illustrated in of FIG. 1.
Figure 6:
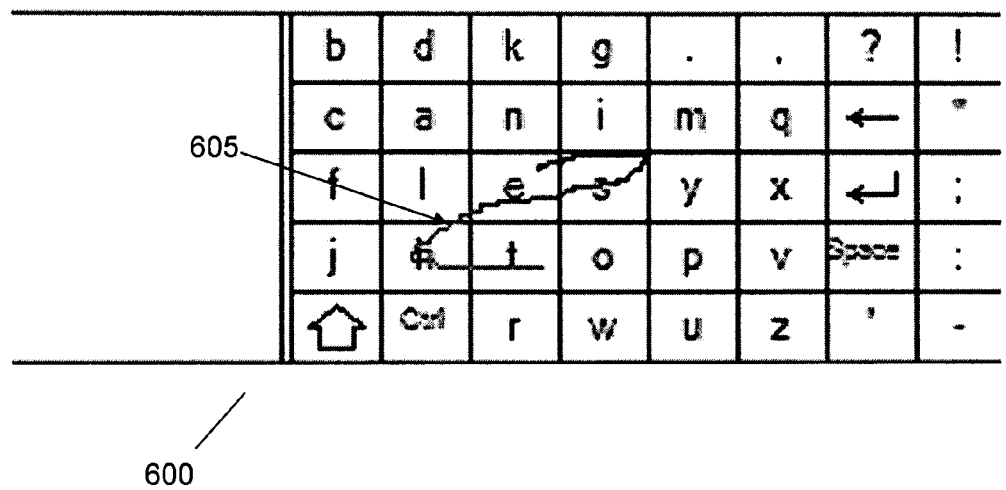
FIG. 6 is an exemplary virtual ATOMIK keyboard illustrating the stroke input of the word "these."

A high-level hierarchy of one embodiment of the word pattern recognition system and method is illustrated in FIG. 2. The system and method comprises a continuous stroke recognizer 205 to capture a continuous stroke of a user on a virtual keyboard interface 200. An example of continuous stroke input on a virtual ATOMIK keyboard interface 600 is shown in FIG. 6, which also illustrates a continuous stroke 605. In the embodiment illustrated in FIG. 2, the continuous stroke recognizer 205 sends a preview set of words to a preview unit 210. The preview unit 210 then displays the preview set of words in correction display 215. The preview set of words can be empty in which case no word is displayed in the correction display 215. The preview set of words can consist of only one word in which case only one preview word is displayed in the correction display, and so on. The order of the steps in the embodiments illustrated in the various drawing figures, including FIGS. 2, 3, 4 and 5, may be varied depending upon the application and desired result or output.

In an alternative embodiment, a user is provided with the option of directly selecting a preview word by extending the continuous stroke to intersect the representation of the intended preview word in the correction display. In an alternative embodiment, a representation of a cancellation action is displayed in the correction display. In that embodiment, the user cancels the uncompleted stroke input by extending the continuous stroke to intersect the representation of the cancellation action in the correction display.

Figure 7:
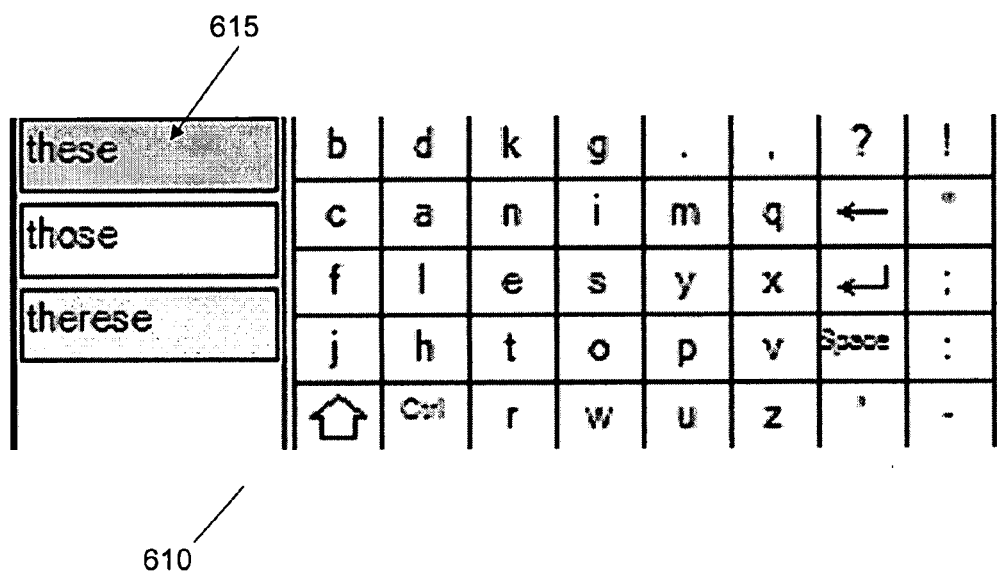
FIG. 7 is an exemplary virtual ATOMIK keyboard illustrating a correction display.

When an input stroke is completed, the continuous stroke recognizer 205 in FIG. 2 sends a final set of words to the correction display 215. The correction display sends the best matching word to the output unit 220. The best matching word is then the current output word. FIG. 7 shows an example of a correction display 615 associated with a virtual ATOMIK keyboard 610 after the user has completed a stroke. In FIG. 7, the current output word is "these", and the words "those" and "therese" are next best matching words. In this embodiment, the user is provided with an option to delete the current output word by selecting the representation of the current output word in the correction display.

The user may then change the current output word to another word by selecting it from the final set of words displayed in the correction display 215. If the user changes the current output word, a series of edit actions are sent to the output unit. In one embodiment, the output unit 220 will then synthesize a sequence of BACKSPACE key press events and inject them into the keyboard queue in the operating system. For example, if the current output word was "the", three BACKSPACE key press events are synthesized and injected into the keyboard queue in order to delete the word "the" at the text caret position in the operating system. Afterwards, the user's new current output word is sent to the output unit 220.

Figure 3:
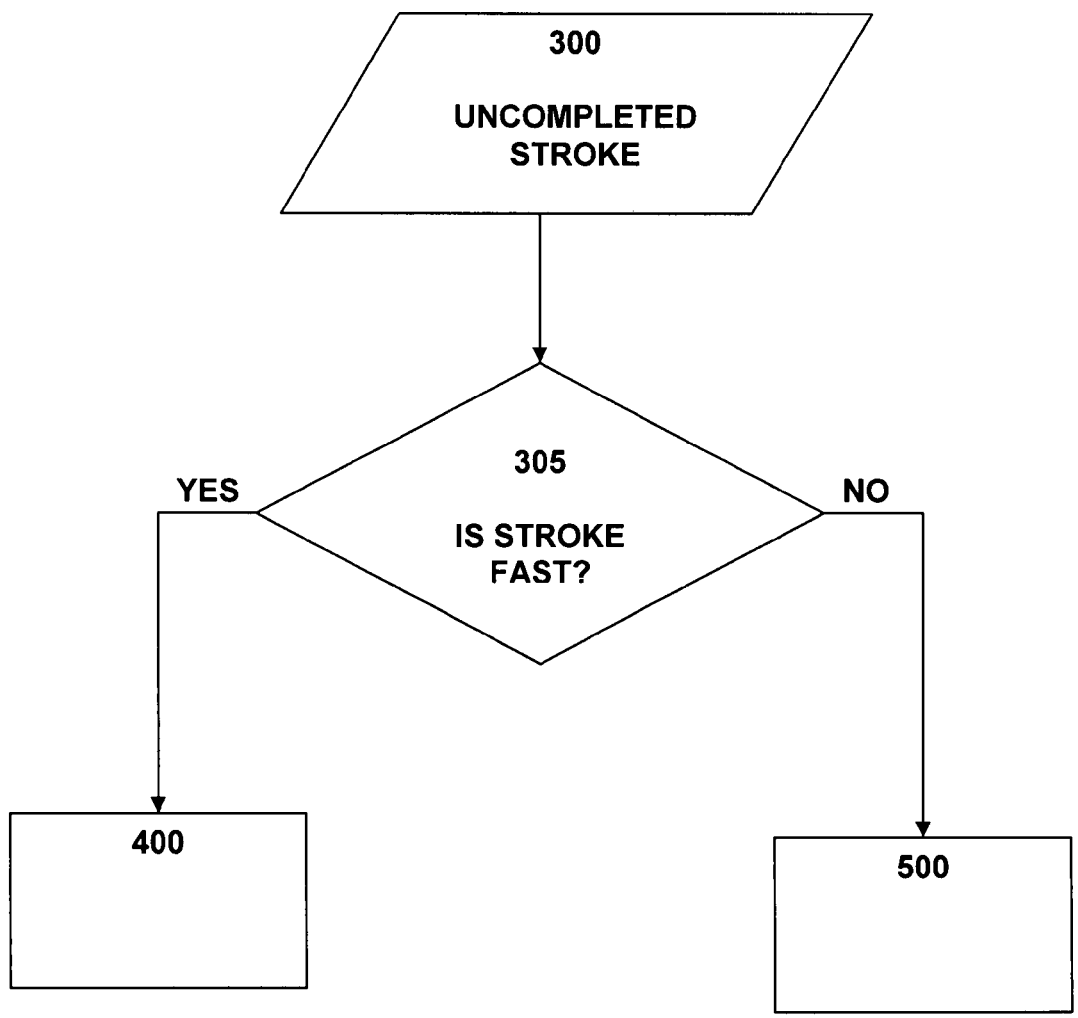
FIG. 3 is a flow chart that illustrates a decision step for determining whether a continuous stroke exceeds a predetermined speed.

The process flowchart in FIG. 3 illustrates the preferred decision process for uncompleted strokes in the preview system. Decision step 305 determines if the uncompleted input stroke 300 is fast. In one embodiment, this relative speed is determined by calculating the number of spatial units the continuous stroke has moved per time interval. If this number is more than a predetermined threshold, the stroke is fast.

Decision step 305 can be invoked in a number of ways. In one embodiment, decision step 305 is invoked whenever a continuous stroke is input.

In another embodiment, to ease the computational load on the system, decision step 305 is invoked at a fixed interval whenever a continuous stroke is inputted. For example, decision step 305 can be invoked every 20 ms (50 Hz).

Figure 4:
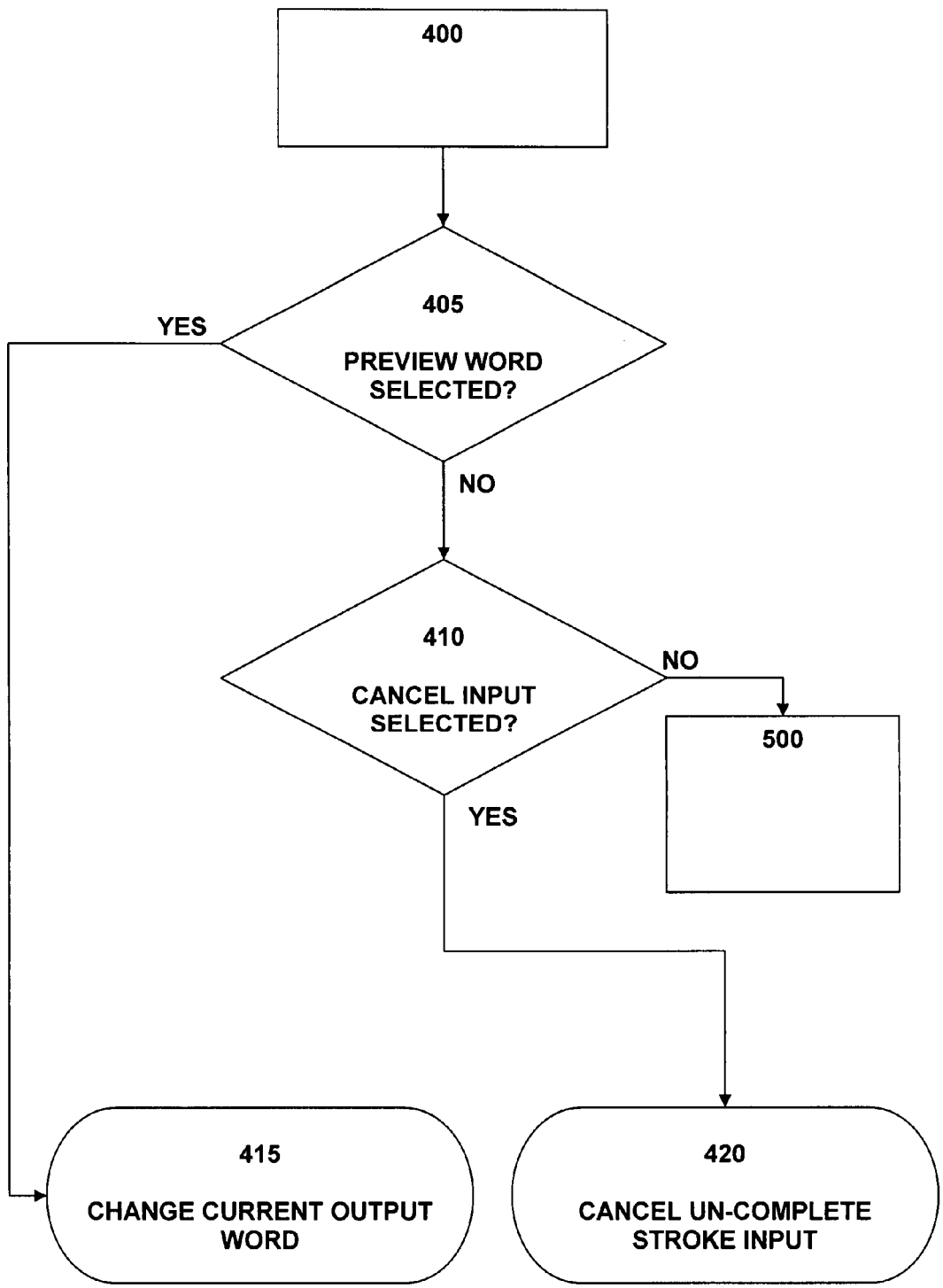
FIG. 4 is a flowchart illustrating a method of determining whether a user desires to input a current preview word or, alternatively, to continue the continuous stroke input.
Figure 5:
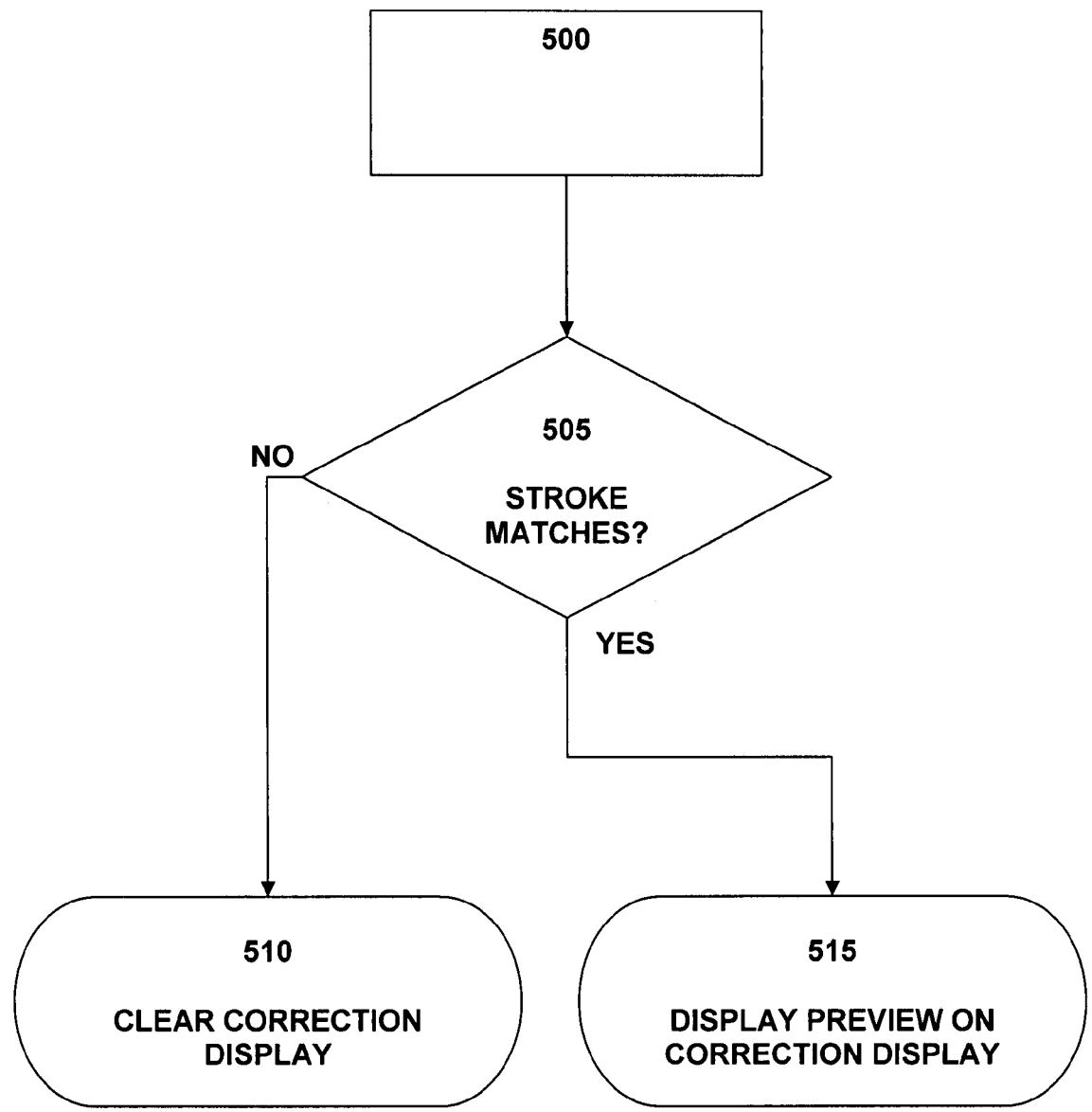
FIG. 5 is a flowchart illustrating a method of determining whether to display a preview of a recognized word or, alternatively, to clear or delete a preview of a word.

If the stroke is determined to be fast in decision step 305, the method proceeds to step 400 (see FIG. 4) and decision step 405 in FIG. 4 decides if a representation of a preview word is selected in the correction display 215. In one embodiment, decision step 405 is decided by calculating whether the spatial coordinates of the input stroke intersects the graphical representation of a preview word in the correction display 215.

If decision step 405 decides a preview word is selected in the correction display 215, the current output word is changed in this embodiment into a new preview word 415. For instance, if the current output word is "these" and the continuous stroke is at decision step 305 decided to be fast, and selected the word "those" at decision step 405, a message is sent to output unit 220 to delete the word "these" and replace it with the word "those". The correction panel is changed in this example to reflect the change of current word. For example, the background color of the words in the correction display may be changed to reflect the current output word. It is not necessary that there be a current output word in all circumstances. For example, in one embodiment, when a user gestures the shorthand for "the", the system and method only shows a preview and does not output a word to an operating system or application (MS Word, for example). Only after the user has lifted the pen, the word "the" is output to such OS or application. In one example, if the user would choose alternative word "thee", for example, the system would not communicate to the output unit as no word has yet been sent to the output unit. In another example, however, a current output word may be sent to an associated application. Therefore, when a user is gesturing, the application may be constantly changing depending on which word is currently previewed.

If the stroke is determined to be fast in decision step 305, the method proceeds to step 400 (see FIG. 4) and decision step 410 in FIG. 4 determines if a cancel input representation is selected in the correction display 215. In one embodiment, decision step 405 is determined by calculating whether the spatial coordinates of the input stroke intersects the graphical representation of the cancel input representation in the correction display 215.

Figure 11:
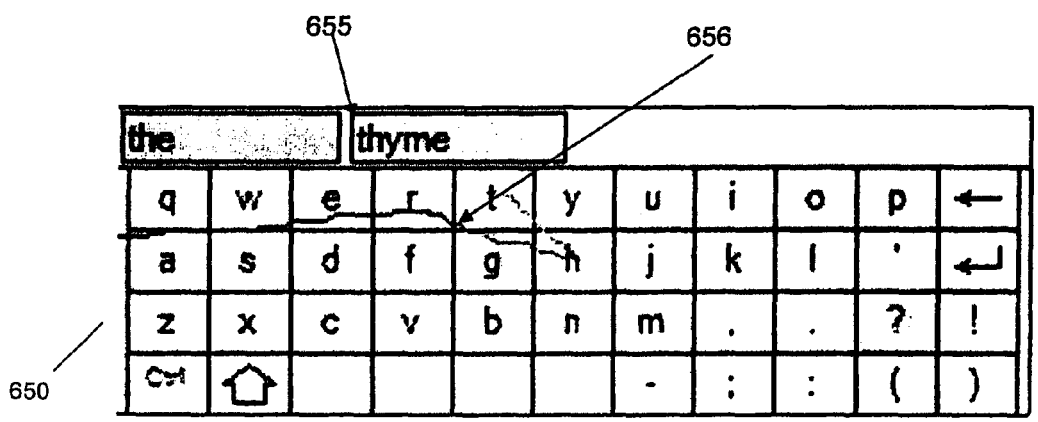
FIG. 11 shows an exemplary virtual QWERTY keyboard illustrating cancellation of the current input. The preview word "the" is cancelled in this illustration which shows movement of the pen trace towards the left edge of the virtual keyboard layout.

If decision step 410 determines that a cancel input representation is selected in correction display 215 by the uncompleted stroke 300, the uncompleted stroke 300 is cancelled 420, a STOP message is sent to continuous stroke recognizer 205, and the correction display 215 is cleared and shows no current word or any next-best matching word candidates. In one embodiment, a cancel input representation is a stroke going outside the left, right or bottom virtual keyboard boundaries. As an example, FIG. 11 illustrates an uncompleted continuous stroke 656 that continues outside the virtual keyboard's 650 left edge. In FIG. 11, display 655 is illustrated adjacent to the top edge of the virtual keyboard 650.

If at step 305 it is determined that the uncompleted stroke 300 is not fast, or if decision step 410 decides that the uncompleted stroke 300 does not select the cancel input representation in correction display 215, the method proceeds to step 500 (see FIG. 5) and decision step 505 determines whether the input stroke matches at least one word in the continuous stroke recognizer 205. If the uncompleted stroke 300 does not match at least one word in the continuous stroke recognizer 205, correction display 215 is cleared at step 510 in FIG. 5. If the uncompleted stroke 300 does match at least one word in the continuous stroke recognizer 205, correction display 215 is cleared, and updated to display the current preview set of words 515 from the continuous stroke recognizer 205.

Figure 8:
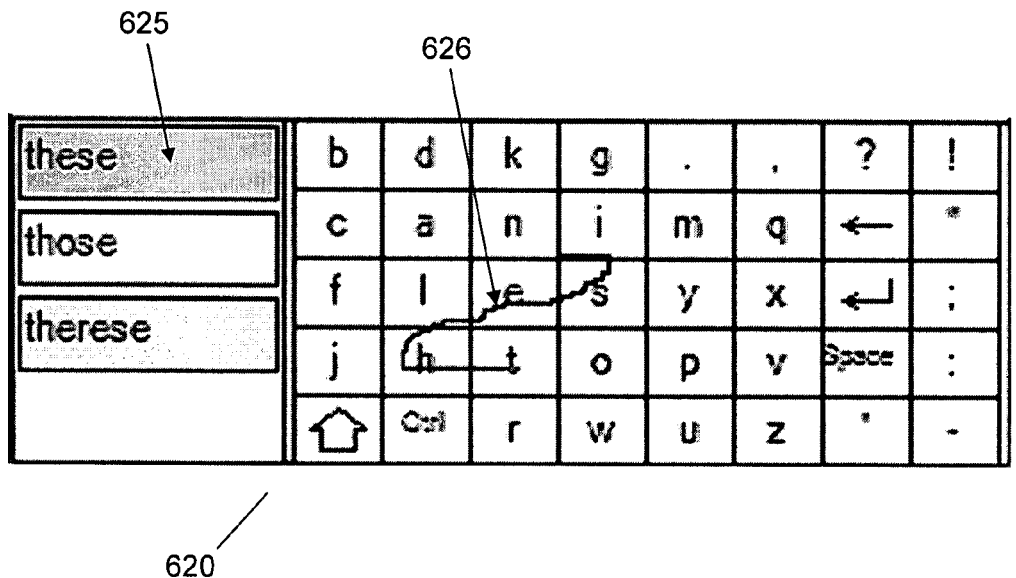
FIG. 8 is an exemplary virtual ATOMIK keyboard illustrating a correction display displaying a preview of matching words in response to uncompleted stroke input of the word "these."

FIG. 8 illustrates an uncompleted stroke 626 on a virtual keyboard 620 with an integrated correction display 625. The uncompleted stroke is recognized by continuous stroke recognizer 205 to a ranked preview set of words: {"these", "those", "therese"}. These are displayed in integrated correction display 625.

Figure 9:
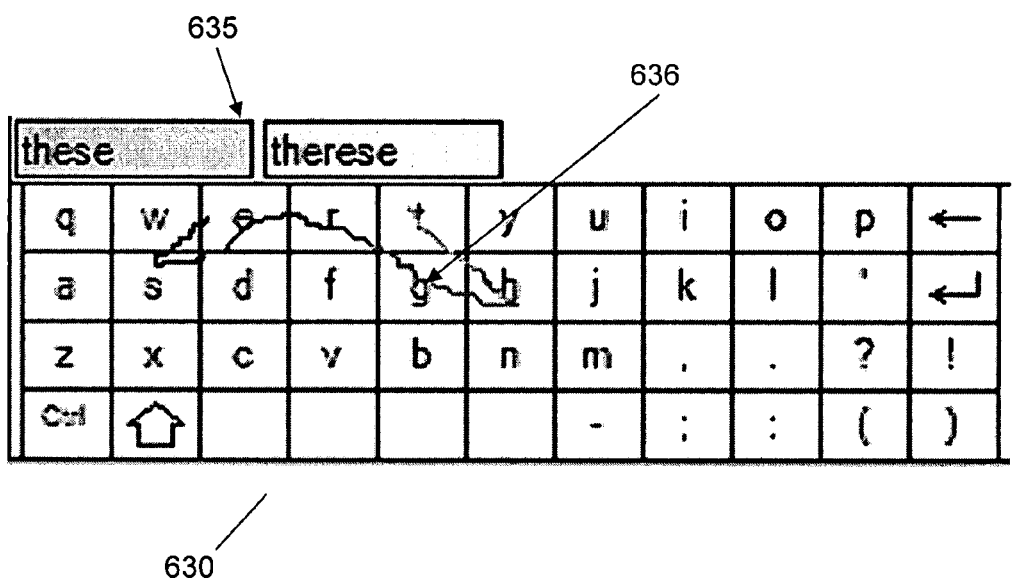
FIG. 9 is an exemplary virtual QWERTY keyboard illustrating a correction display displaying a preview of matching words in response to uncompleted stroke input of the word "these."

FIG. 9 illustrates an alternative design where the virtual keyboard layout 630 is the standard desktop QWERTY keyboard layout, and the corrective display 635 is illustrated at the top of the keyboard. A continuous stroke 636 is also shown.

Figure 10:
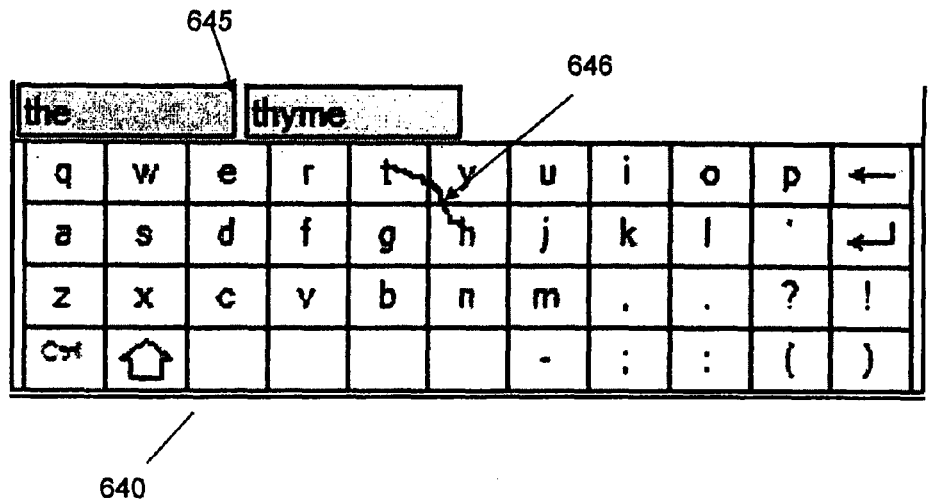
FIG. 10 shows an exemplary virtual QWERTY keyboard illustrating preview words corresponding to only a substring of a word.

In alternative embodiment, not only complete words are recognized but also substrings of words. For example the substring "co" can refer to the word "copy", the word "comment" and the word "columns". FIG. 10 illustrates an embodiment with a virtual keyboard 640 where uncompleted stroke 646 is recognized by a continuous stroke recognizer 205 to a ranked preview set of close matching words 645 that have substrings represented.

In an alternative embodiment, command names are recognized by a continuous stroke recognizer 205, previewed in a correction display and outputted by an output unit. When the output unit decides a command name has been inputted, for example "Undo", the output unit sends the recognized command. For example, in one embodiment the output unit sends the command "Undo" by synthesizing key presses for pressing Ctrl+Z, which is used in the Microsoft Windows operating system to signal the "Undo" command.

Figure 12A:
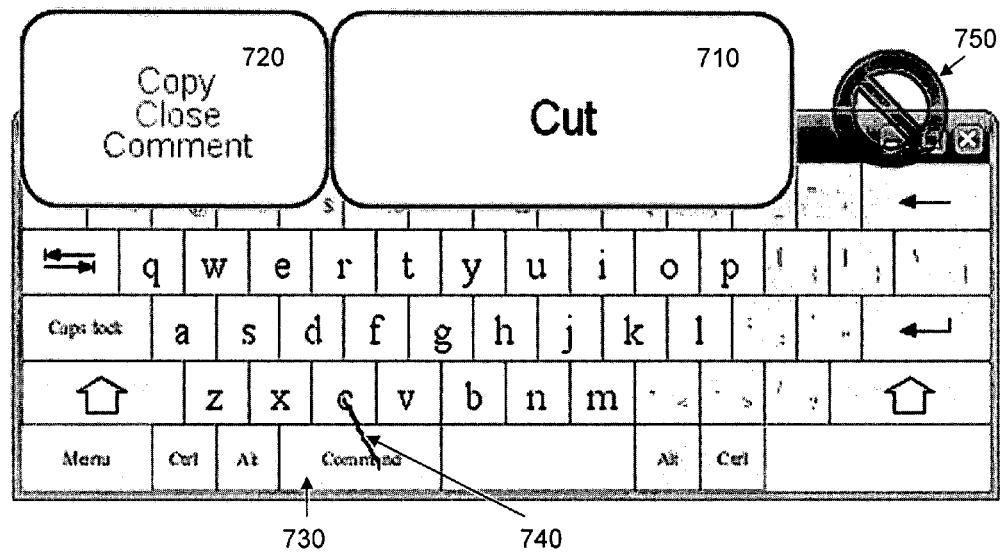
FIGS. 12A and 12B illustrate an alternative design of a correction display integrated into a virtual keyboard, with a cancel input representation at the top left in the form of an icon.

In an alternative embodiment, command names are recognized by substrings of the command names as well as complete command names. FIG. 12A illustrates an uncompleted continuous stroke 740 on a virtual keyboard 700 that is recognized as the command "cut" because continuous stroke 740 is a close match to the substring Command-C that is a substring of the command sequence Command-C-U-T for "cut". In this example, the continuous stroke 740 intersects both a command key 730 and the letter "c". The desired command, "Copy", is displayed in the left display 720, but because the input sequence "Command-C" also matches "Cut", "Cut" is previewed in the primary display 710 (because, in this example, it is the shorter word). To select the desired command, "Copy", the user could simply quickly move his or her pen or finger toward "Copy" on the left display 720 or continue the stroke at normal speed toward the letter "o" on the keyboard 700.

Figure 12B:
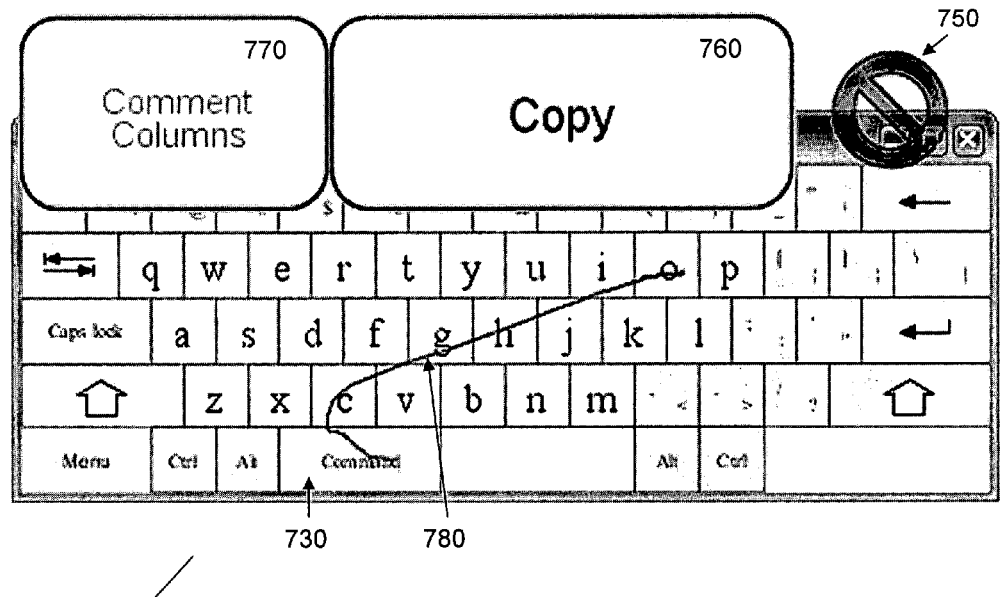

FIG. 12B illustrates the same virtual keyboard 700 with an uncompleted continued continuous stroke 780 from FIG. 12A where continuous stroke 780 is a close match the command "copy" because continuous stroke 780 is a close match to the substring of the command sequence Command-C-O for "copy", touching upon the command key 730, and then the "c" and "o" keys. Thus, the primary display 760 and alternative display 770 change to reflect further movement in the continuous stroke 780.

While there has been described what is believed to be the preferred embodiment of the present invention, those skilled in the art will recognize that other and further changes and modifications may be made thereto without departing from the spirit of the invention. Therefore, the invention is not limited to the specific details and representative embodiments shown and described herein. Accordingly, various modifications may be made without departing from the spirit or scope of the general inventive concept as defined and differentiated by the following claims.

What is claimed is:

1. A method of displaying a preview of known continuous stroke patterns in a continuous stroke system, comprising:
   receiving a first part of a continuous stroke which has been input into a virtual keyboard;
   comparing said first part of said continuous stroke with a plurality of known continuous stroke patterns which correspond to a plurality of known words;
   generating a preview of known words which correspond to said first part of said continuous stroke; and
   displaying said preview on a display prior to completion of said continuous stroke, wherein said continuous stroke system is associated with an electronic device, wherein said known continuous stroke patterns comprise commands to an electronic device associated with said virtual keyboard.

2. The method of claim 1, further comprising:
   receiving a second part of said continuous stroke;
   comparing said first part and said second part of said continuous stroke with a plurality of known continuous stroke patterns which correspond to a plurality of known words;
   displaying a preview of known words which correspond to said first part and said second part of said continuous stroke; and
   displaying said preview on said display prior to completion of said continuous stroke.

3. The method of claim 1, further comprising:
   receiving a completed continuous stroke;
   comparing said completed continuous stroke with a plurality of known continuous stroke patterns which correspond to a plurality of known words;
   displaying a plurality of known words which correspond to said completed continuous stroke; and
   displaying said plurality of known words on said display.

4. The method of claim 1 wherein said display is integrated with said virtual keyboard.

5. The method of claim 1 wherein said display is positioned outside said virtual keyboard.

6. The method of claim 1 wherein said known words in said preview are alternatively selectable, further comprising:
   accepting a selection of a desired known word in said preview when a part of a continuous stroke intersects with said desired known word in said preview.

7. The method of claim 6 wherein said continuous stroke system is associated with an operating system, further comprising:
   outputting said desired known word to said associated operating system.

8. The method of claim 6 wherein said continuous stroke system is associated with an active application, further comprising:

outputting said desired known word to said associated active application.

9. The method of claim 8 wherein said associated active application is a word processor, an e-mail client, instant messaging client or forms application.

10. The method of claim 1, further comprising:
receiving spatiotemporal information concerning said continuous stroke;
comparing said spatiotemporal information to expected values; and
displaying said preview on said display if said spatiotemporal information differs from said expected values.

11. The method of claim 1, further comprising:
receiving spatiotemporal information concerning said continuous stroke;
comparing said spatiotemporal information to expected values; and
accepting a selection of a desired known word in said preview if said spatiotemporal information differs from said expected values.

12. The method of claim 1 wherein said continuous stroke method is associated with an active application, further comprising:
receiving speed information concerning a rate of movement of said continuous stroke;
comparing said speed information to a predetermined value;
outputting to an associated active application a known word of said known words in said word preview if said speed information is greater than said predetermined value;
whereby the known word in said preview may be selected.

13. The method of claim 1, further comprising:
terminating the receiving of said continuous stroke if part of said continuous stroke intersects with a predetermined edge of said virtual keyboard.

14. The method of claim 1 wherein said virtual keyboard comprises an icon, further comprising:
terminating the receiving of said continuous stroke if part of said continuous stroke intersects with said icon.

15. The method of claim 1, further comprising:
defining continuous stroke patterns of a plurality of known words by a plurality of input paths, wherein each input path is associated with a word input into a virtual keyboard; and
matching the path of said first part of said continuous stroke with a corresponding defined word pattern.

16. The method of claim 1, further comprising:
comparing said first part of said continuous stroke with a plurality of known continuous stroke patterns which correspond to a plurality of known commands;
matching said first part of said continuous stroke to a corresponding continuous stroke pattern; and
executing an instruction corresponding to said corresponding continuous stroke pattern.

17. The method of claim 1, further comprising:
providing a computer, PDA, cellular phone, smartphone, tablet PC or mobile communications device having a virtual keyboard.

18. The method of claim 1, further comprising:
providing a projection device for projecting said virtual keyboard on a wall, screen or display;
wherein said continuous stroke is input via the projected representation of said virtual keyboard.

19. A computer-readable storage medium having computer-executable instructions for displaying a preview known continuous stroke patterns in a continuous stroke system, comprising:
instructions for receiving a first part of a continuous stroke which has been input into a virtual keyboard;
instructions for comparing said first part of said continuous stroke with a plurality of known continuous stroke patterns which correspond to a plurality of known words;
instructions for generating a preview of known continuous stroke patterns which correspond to said first part of said continuous stroke; and
instructions for displaying said preview on a display prior to completion of said continuous stroke,
wherein said continuous stroke system is associated with an electronic device, wherein said known continuous stroke patterns comprise commands to an electronic device associated with said virtual keyboard.

20. The computer-readable storage medium of claim 19, further comprising:
instructions for receiving a second part of said continuous stroke;
instructions for comparing said first part and said second part of said continuous stroke with a plurality of known continuous stroke patterns which correspond to a plurality of known words;
instructions for displaying a preview of known words which correspond to said first part and said second part of said continuous stroke; and
instructions for displaying said preview on said display prior to completion of said continuous stroke.

21. The computer-readable storage medium of claim 19, further comprising:
instructions for receiving a completed continuous stroke;
instructions for comparing said completed continuous stroke with a plurality of known continuous stroke patterns which correspond to a plurality of known words;
instructions for displaying a plurality of known words which correspond to said completed continuous stroke; and
instructions for displaying said plurality of known words on said display.

22. The computer-readable storage medium of claim 19 wherein said display is integrated with said virtual keyboard.

23. The computer-readable storage medium of claim 19 wherein said known words in said preview are alternatively selectable, further comprising:
instructions for accepting a selection of a desired known word in said preview when a part of a continuous stroke intersects with said desired known word in said preview.

24. The computer-readable storage medium of claim 23 wherein said continuous stroke system is associated with an operating system, further comprising:
instructions for outputting said desired known word to said associated operating system.

25. The computer-readable storage medium of claim 23 wherein said continuous stroke system is associated with an active application, further comprising:
instructions for outputting said desired known word to said associated active application.

26. The computer-readable storage medium of claim 19, further comprising:
instructions for receiving spatiotemporal information concerning said continuous stroke;
instructions for comparing said spatiotemporal information to expected values; and instructions for displaying said preview on said display if said spatiotemporal information differs from said expected values.

27. The computer-readable storage medium of claim 19, further comprising:
instructions for receiving spatiotemporal information concerning said continuous stroke;
instructions for comparing said spatiotemporal information to expected values; and
instructions for accepting a selection of a desired known word in said preview if said spatiotemporal information differs from said expected values.

28. The computer-readable storage medium of claim 19 wherein said continuous stroke system is associated with an active application, further comprising:
instructions for receiving speed information concerning a rate of movement of said continuous stroke;
instructions for comparing said speed information to a predetermined value;
instructions for outputting to an associated active application a known word of said known words in said word preview if said speed information is greater than said predetermined value;
whereby the known word in said preview may be selected.

29. The computer-readable storage medium of claim 19, further comprising:
instructions for terminating the receiving of said continuous stroke if part of said continuous stroke intersects with a predetermined edge of said virtual keyboard.

30. The computer-readable storage medium of claim 19 wherein said virtual keyboard comprises an icon, further comprising:
instructions for terminating the receiving of said continuous stroke if part of said continuous stroke intersects with said icon.

31. The computer-readable storage medium of claim 19, further comprising:
instructions for defining continuous stroke patterns of a plurality of known words by a plurality of input paths, wherein each input path is associated with a word input into a virtual keyboard; and
instructions for matching the path of said first part of said continuous stroke with a corresponding defined word pattern.

32. The computer-readable storage medium of claim 19, further comprising:
instructions for comparing said first part of said continuous stroke with a plurality of known continuous stroke patterns which correspond to a plurality of known commands;
instructions for matching said first part of said continuous stroke to a corresponding continuous stroke pattern; and
instructions for executing an instruction corresponding to said corresponding continuous stroke pattern.

33. The computer-readable storage medium of claim 19, further comprising:
a computer, PDA, cellular phone, smartphone, tablet PC or mobile communications device having a virtual keyboard.

34. The computer-readable storage medium of claim 19, further comprising:
a projection device for projecting said virtual keyboard on a wall, screen or display;
wherein said continuous stroke is input via the projected representation of said virtual keyboard.

35. A system for displaying a preview of known continuous stroke patterns in a continuous stroke system, comprising:
means for receiving a first part of a continuous stroke which has been input into a virtual keyboard;
means for comparing said first part of said continuous stroke with a plurality of known continuous stroke patterns which correspond to a plurality of known words;
means for generating a preview of known continuous stroke patterns which correspond to said first part of said continuous stroke; and
means for displaying said preview on a display prior to completion of said continuous stroke,
wherein said continuous stroke system is associated with an electronic device, wherein said known continuous stroke patterns comprise commands to an electronic device associated with said virtual keyboard.

36. The system of claim 35, further comprising:
means for receiving a second part of said continuous stroke;
means for comparing said first part and said second part of said continuous stroke with a plurality of known continuous stroke patterns which correspond to a plurality of known words;
means for displaying a preview of known words which correspond to said first part and said second part of said continuous stroke; and
means for displaying said preview on said display prior to completion of said continuous stroke.

37. The system of claim 35, further comprising:
means for receiving a completed continuous stroke;
means for comparing said completed continuous stroke with a plurality of known continuous stroke patterns which correspond to a plurality of known words;
means for displaying a plurality of known words which correspond to said completed continuous stroke; and
means for displaying said plurality of known words on said display.

38. The system of claim 35 wherein said known words in said preview are alternatively selectable, further comprising:
means for accepting a selection of a desired known word in said preview when a part of a continuous stroke intersects with said desired known word in said preview.

39. The system of claim 38 wherein said continuous stroke system is associated with an operating system, further comprising:
means for outputting said desired known word to said associated operating system.

40. The system of claim 38 wherein said continuous stroke system is associated with an active application, further comprising:
means for outputting said desired known word to said associated active application.

41. The system of claim 40 wherein said associated active application is a word processor, an e-mail client, instant messaging client or forms application.

42. The system of claim 35, further comprising:
means for receiving spatiotemporal information concerning said continuous stroke;
means for comparing said spatiotemporal information to expected values; and
means for displaying said preview on said display if said spatiotemporal information differs from said expected values.

43. The system of claim 35, further comprising:
   means for receiving spatiotemporal information concerning said continuous stroke;
   means for comparing said spatiotemporal information to expected values; and
   means for accepting a selection of a desired known word in said preview if said spatiotemporal information differs from said expected values.

44. The system of claim 35 wherein said continuous stroke system is associated with an active application, further comprising:
   means for receiving speed information concerning the rate of movement of said continuous stroke;
   means for comparing said speed information to a predetermined value;
   means for outputting to an associated active application a known word in said preview if said speed information is greater than said predetermined value;
   whereby a known word in said preview may be selected.

45. The system of claim 35, further comprising:
   means for terminating the receiving of said continuous stroke if part of said continuous stroke intersects with a predetermined edge of said virtual keyboard.

46. The system of claim 35 wherein said virtual keyboard comprises an icon, further comprising:
   means for terminating the receiving of said continuous stroke if part of said continuous stroke intersects with said icon.

47. The system of claim 35, further comprising:
   means for defining continuous stroke patterns of a plurality of known words by a plurality of input paths, wherein each path is associated with a word input into a virtual keyboard; and
   means for matching the path of said first part of said continuous stroke with a corresponding word pattern.

48. The system of claim 35, further comprising:
   means for comparing said first part of said continuous stroke with a plurality of known continuous stroke patterns which correspond to a plurality of known commands;
   means for matching said first part of said continuous stroke to a corresponding continuous stroke pattern; and
   means for executing an instruction corresponding to said corresponding continuous stroke pattern.

49. The system of claim 35, further comprising:
   means for providing a computer, PDA, cellular phone, smartphone, tablet PC or mobile communications device having a virtual keyboard.

50. The system of claim 35, further comprising:
   means for providing a projection device for projecting said virtual keyboard on a wall, screen or display;
   wherein said continuous stroke is input via the projected representation of said virtual keyboard.

51. The system of claim 35 wherein said display is integrated with said virtual keyboard.

* * * * *

UNITED STATES PATENT AND TRADEMARK OFFICE
CERTIFICATE OF CORRECTION

| | | |
|---|---|---|
| PATENT NO. | : 7,895,518 B2 | Page 1 of 1 |
| APPLICATION NO. | : 11/796654 | |
| DATED | : February 22, 2011 | |
| INVENTOR(S) | : Per Ola Kristensson | |

It is certified that error appears in the above-identified patent and that said Letters Patent is hereby corrected as shown below:

On the first page, in field (56), in column 2, under "Other Publications", line 1, delete "SofType" and insert -- SoftType --, therefor.

On the first page, in field (56), in column 2, under "Other Publications", line 7, delete "pagse," and insert -- pages, --, therefor.

In column 2, line 28, delete ""Copy, "" and insert -- "Copy," --, therefor.

Signed and Sealed this
Twenty-fourth Day of May, 2011

David J. Kappos
*Director of the United States Patent and Trademark Office*